Aug. 4, 1970  T. A. O. GROSS  3,523,275
SYSTEM FOR TRANSMITTING AND DETECTING ACOUSTIC SIGNALS
Filed July 23, 1968  2 Sheets-Sheet 1

INVENTOR.
Thomas A. O. Gross
BY Brown and Mikulka
and
Gerald L. Smith
ATTORNEYS

United States Patent Office 3,523,275
Patented Aug. 4, 1970

3,523,275
SYSTEM FOR TRANSMITTING AND DETECTING ACOUSTIC SIGNALS
Thomas A. O. Gross, Lincoln, Mass., assignor to Polaroid Corporation, Cambridge, Mass., a corporation of Delaware
Filed July 23, 1968, Ser. No. 746,859
Int. Cl. G01s 9/68
U.S. Cl. 340—1                    14 Claims

ABSTRACT OF THE DISCLOSURE

A system for transmitting and detecting accoustic signals which utilizes a singular polarizable transducer. The transducer is driven at a select frequency in a manner such that it generates acoustic signals at the second harmonic of the driving frequency. By polarizing the transducer during a receiving or detection interval, the device becomes responsive to acoustic echo pulses at the second harmonic frequency. The wide variance in transmitting and receiving frequencies permits the use of a simple high pass filter between the transmitting and receiving functions of the system.

This invention relates to distance-measuring devices of the pulse-echo type and, more particularly, to an acoustic ranging system incorporating a singular airloaded transducer for both propagating and detecting signals.

BACKGROUND OF THE INVENTION

The technical disciplines have developed a broad variety of systems using reflection or pulse-echo arrangements for measuring distances and locating remote objects. For extended range applications, techniques of electromagnetic wave propagation characterized by high velocities and consequent rapid rates of response are commonly employed by the ranging systems. Within relatively short ranges, however, this form of wave propagation becomes impractical inasmuch as the time interval spanning the transmission of a pulse and the reception of its echo reflecting from a target is highly abbreviated and difficult to discern. A lower velocity signal transmission technique is preferred a these shorter distances and acoustic energy systems are conventionally employed. Within an atmospheric or gaseous environment, the acoustic signals are generated in the ultrasonic region to permit less complex forms of echo detection and discrimination. As suggested by their shortened range limitations, systems utilizing airborne acoustic energy find more practical applications with equipment of relatively small size or portable configuration.

Acoustic ranging devices recently have been considered as ideally adaptable to serve as rangefinders for photographic cameras and the like. One such adaptation is illustrated and described in a copending application for United States patent by C. H. Biber and W. R. Pope, Jr., Ser. No. 715,644 entitled "Rangefinding and Focusing System for Photographic Cameras and the Like," filed Feb. 7, 1968.

The critical camera-to-object distance adjustments typically required in photographic practice ideally coincide with the practical range limitations of airborne acoustic systems. Coupled with the lens translational adjustment mechanism of a camera, such distance-finding devices are capable of continuously tracking and focusing upon an object within a scene to be photographed. Such a continous tracking capability allows for automatic lens focusing adjustment throughout a film exposing procedure. By virtue of this uninterrupted and automatic focal adjustment, moving objects may be photographed with relative ease. For instance, such systems readily track and cause focal adjustment for targets moving toward or away from the camera. As a result, while photographing such subject matter, it is not necessary to estimate a focal distance for an anticipated position of the moving target. In the same regard, no manual steps for focusing adjustment are required of an operator during an exposure sequence beyond simple activation of the automatic ranging mechanism of the system.

To be incorporated within photographic apparatus in a practical manner, however, acoustic rangefinder systems must conform with the design criteria of modern camera structures. In particular, the ranging devices must be fabricable in very small dimension to permit their insertion within or mounting upon the conveniently compact configurations of camera housings. This minaturization requirement has introduced complexities in the provision of certain components of the acoustic systems. Conventional transducer elements generally require electrical driving signals of relatively high intensity. The resultant acoustic signal is of correspondingly high intensity. These signals have been found to disturb the response or partially jam the receiving functions of the acoustic systems. To overcome resultant "cross talk" or interference between transmission and reception, it heretofore has been considered necessary to insert two distinct transducer elements within the devices, one serving to transmit and the other to receive acoustic signals. In addition to contributing significantly to unwanted bulk or component size, the dual arrangement presents problems in mounting the transducers upon a compact camera housing. The unitary and compact structure of these housings will, without suitable correction, create cross talk effects between the transducers, thereby degrading the quality of the acoustic system. To adequately isolate the transmitting element from the receiving element, it is generally necessary to interpose relatively bulksome cushioning devices or the like between the housing of a camera and the transducer element. This arrangement militates against a requisite system compactness or miniaturization.

For camera applications, the dual transducer arrangement may also introduce complex mutual alignment requirements. Both of the elements must react to transmit or respond, respectively, to signals driected to and reflected from a target positioned at varying optic distances from the lens system of the camera. Depending upon the configuration of the signal propagation lobes of the transmitting devices, adjustment may be required to provide a parallax form of compensation.

Singular transducers incorporating both transmitting and receiving functions through the use of duplexing arrangements are known in the art. However, for the short pulse interval spacing required of the instant applications, adequate damping in air following transmission and reception is not present. As a consequence, a relatively bulksome dual transducer technique has heretofore been considered mandatory.

SUMMARY OF THE INVENTION

The invention now presented provides a short range acoustic detecting or ranging system which utilizes a singular transducer device for both transmitting and receiving airborne signals. By interposing a wide variation between the frequency of the signal utilized to actuate the acoustic transducer of the system and the frequency at which the airborne acoustic signal is propagated, transmitted and received pulses within the system are uniquely isolated. As a consequence of this variance in frequency values, interference between the transmitting and receiving function of the system is advantageously eliminated.

The wide variation in frequencies utilized in the transmitting and receiving functions of the invention is uniquely adapted for use with transducer devices of a variety which are self-damping. As a result, the system may be designed for use with only a single transducer having a vibratile airloaded surface.

The acoustic system of the invention is characterized in the use of an alternating current input of select first frequency to energize a transducer at each half cycle. As a consequence, the transducer functions to propagate an acoustic signal at twice the appiled frequency. Each pulse echo of this second or harmonic signal frequency is then received by the same transducer for conversion to a range function. By virtue of the use of the significantly different frequencies to effect broadcasting and detecting, ideally simplified and highly efficient filter techniques may be incorporated within devices employing the invention.

Another feature and object of the invention is to provide an acoustic ranging device incorporating a singular airloaded electrostatic transducer which may be driven by an alternating current source at a select frequency to cause an acoustic signal transmission at the second harmonic thereof and which may be polarized to render it receptive to acoustic signals impinging thereon at the said harmonic frequency.

An additional object of the invention resides in the use of an electrostatic microphone form of device as the singular dual function transducer of the system. Through the appropriately timed imposition of a polarizing voltage across the electrostatic transducer, it will react to convert echo pulses impinging there on into a received signal at the harmonic frequency of the airborne acoustic signal.

The invention further contemplates an acoustic ranging system including a transducer in connection with a circuit which functions to drive the transducer under a select frequency to generate acoustic signals at a second harmonic thereof and simultaneously functions to adequately block a receiving circuit portion during transmission through the media of a high pass filter means. The circuit further functions to impress a polarizing voltage across the transducer throughout the period of signal reception. The transducer functions to modulate this impressed voltage at the second harmonic frequency of such acoustic signals as are impinging upon it during reception.

Another object of the invention is to provide a camera mounted acoustic rangefinding apparatus which advantageously functions in using only one transducer element. The rangefinding apparatus of the invention is fabricable in advantageously miniaturized dimension and may be mounted upon or within conventional camera housing structures without the conventionally required cushioning implements and the like. The simplicity inherent in the circuitry of the invention and also in the resultant mounting for transducer elements incorporated with the circuitry of the invention provides opportunity for broadening the spectrum of sonar system utilization.

Other features of the invention will in part be obvious and will in part appear hereinafter.

The invention accordingly comprises the system and apparatus possessing the construction, combination of elements and arrangement of parts which are exemplified in the following detailed disclosure.

For a fuller understanding of the nature and objects of the invention, reference should be had to the following detailed description taken in conjunction with the accompanying drawings.

DETAILED DESCRIPTION OF THE DRAWINGS

The acoustic ranging system of the invention uniquely combines a particular form of transducer element with a driver and receiver circuit which operates under two widely separated levels of frequency. Because of this wide frequency variance, the reception mechanism and circuitry of the system enjoys a unique immunity from interferences which might otherwise develop between its transmission and detection functions. As an added feature of the arrangement, a single transducer may be used for performing pulse generation and receiving functions. To develop the advantageous frequency separation, it is necessary to utilize a transducer element which is polarizable.

Figure 1:
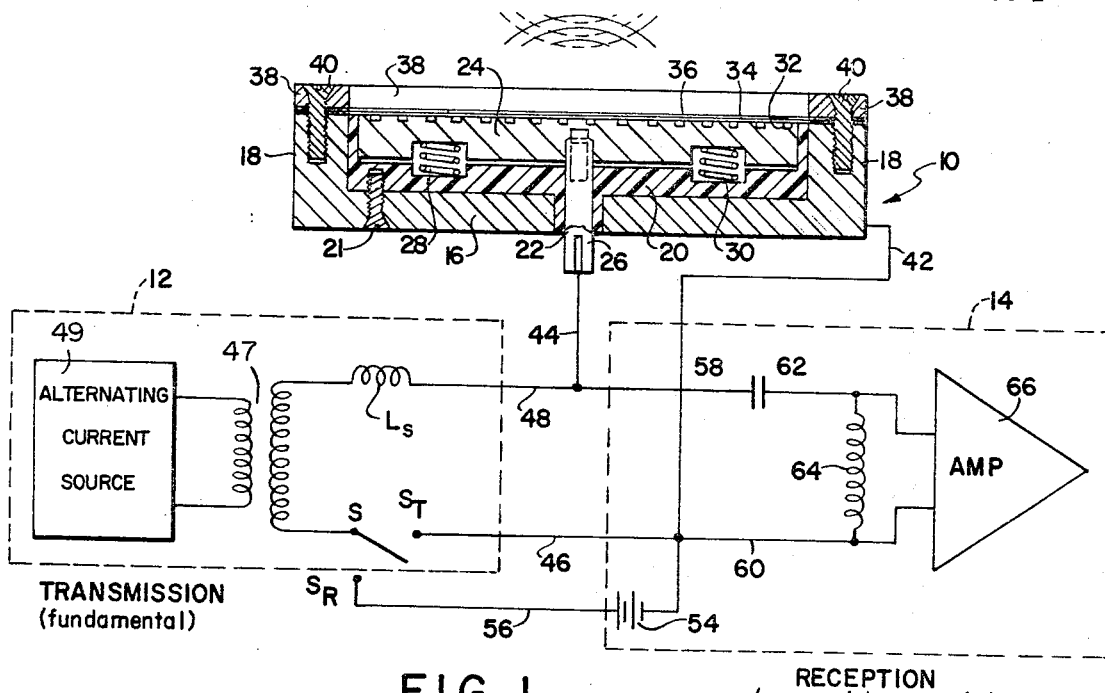
FIG. 1 is a schematic electrical diagram of one embodiment of the present invention shown in conjunction with a cross sectional view of a transducer element of the variety used with the circuitry of the invention.

Referring to FIG. 1, a structure for such a transducer element is illustrated at 10 in conjunction with the transmission or driving function delimited by a dashed boundary line 12 and a reception portion similarly surrounded by dashed line 14. Transducer 10 is of an electrostatic variety resembling a condenser microphone. The transducer is configured having an annular metal housing 16 which is formed to include a peripheral flanged portion 18. Within the internal portion of flanged base 16 there is positioned an electrically insulative insert member 20 secured by a series of screws, one of which is pictured at 21. Member 20, fashioned from a plastic such as polystyrene or the like, extends in continuous fashion through access aperture 22. Insulative member 20 is configured to receive an annular disc-shaped electrode 24. A contact terminal electrically and mechanically connecting the electrode 24 to externally disposed circuitry is shown at 26 extending through the centrally disposed aperture 22. Terminal member 26 structurally cooperates with a plurality of helical springs as at 28 and 30 to adjustably position base electrode 24 at an appropriate level within the housing 16. Within the upper or outwardly facing surface of base electrode 24 there are formed a series of concentric annular grooves 32 of relatively shallow depth.

Stretched over the outwardly facing surface of base electrode 24 is a flexible diaphragm 34. Diaphragm 34 is fashioned from a sheet of plastic such as Mylar, one surface of which is coated with a thin metallic film 36 of aluminum or a similar metal evidencing adequate conductive characteristics. Annular clamping ring 38, secured to the housing peripheral flange 18 by screws as at 40 functions to hold the diaphragm 34 in position over the electrode 24.

Flexible diaphragm 34, in effect, forms one plate of an electrical condenser, the other plate being the base electrode 24, whose surface is parallel to and separated from the diaphragm by an air gap of very small dimensions. A varying potential applied across the plates defining the air gap, will create a similarly variable electrostatic force between them. Inasmuch as diaphragm 34 is flexible, such an attractive force will impart a vibratory movement to the diaphragm to generate acoustic pulses. Conversely, the transducer 10 becomes a detector or receiver by impressing a voltage across the diaphragm 34 and base electrode 24. When the diaphragm 34 is caused to vibrate by incident sound waves, the capacitance of the unit and voltage impressed across it will vary sympathetically. Concentric grooves 32 formed in base electrode 24 are present to improve the frequency response of the transducer and to render the mutual spacing of electrode 24 and diaphragm 34 less critical. To interconnect the transducer 10 with the circuitry of the invention, a lead 42 is electrically coupled to the metallic coating 36 of diaphragm 34 through housing 16, while a lead 44 is coupled with base electrode 24 through centrally disposed terminal 26.

Turning to the transmitting function 12 of the system, the leads 42 and 44 from transducer 10 are shown connected into a conventional driver circuit, respectively, through trunk lines 46 and 48. During transmitting intervals, a switching or selector means as at S is closed across terminal $S_T$, thereby coupling the secondary winding of an impedance transformer 47 with the transducer 10. Transformer 47 is energized by an alternating current source shown generally at 49 at a predetermined frequency, termed herein as the "fundamental frequency." The impedance transformer 47 is selected of a variety having a relatively high leakage inductance which is symbolically represented in the figure as a winding $L_S$ on line 48. This leakage inductance $L_S$ is selected to function as a low pass filter allowing passage of energy at the fundamental frequency, but blocking higher level frequencies.

Figure 2:
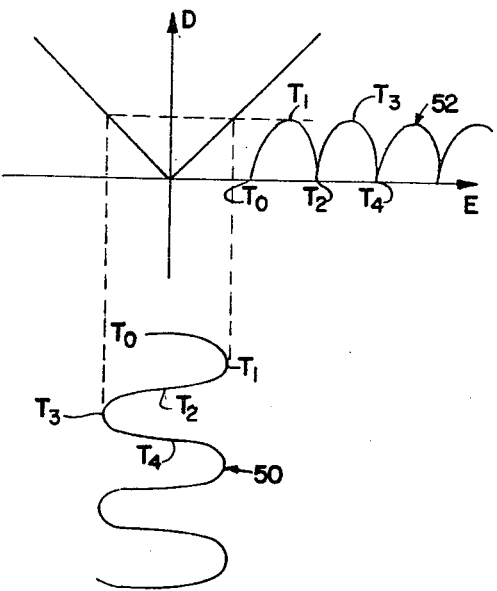
FIG. 2 provides a graphical waveform analysis of the transmitting operation of the invention.

The operation of the transducer 10 under energization by the transmission circuitry is graphically depicted in FIG. 2. In this figure, the instantaneous displacement of the center of diaphragm 34 is plotted against the variable driving voltage E effecting the electrostatic attractive force causing that displacement. The driving voltage E varies sinusoidally at the predetermined frequency $f$ as at curve 50. The relative displacement of diaphragm 34 is plotted as curve 52. Note that at time $T_0$, the potential across the transducer is zero and there is no displacement of the diaphragm. As the applied voltage progresses through its first half cycle, the diaphragm will achieve a maximum displacement at $T_1$ and return to a neutral position at time $T_2$. The reversal of polarity at the transducer occasioned by an alternating source input will not alter the deflective status of the diaphragm. Consequently, as the applied voltage reaches the apex of reverse polarity at time $T_3$, the diaphragm will have again been flexed to a maximum displacement. At the termination time $T_4$, representing a full cycle at the fundamental frequency, the diaphragm will have been fully flexed twice. As a result, the frequency at which acoustic energy is propagated will be twice that of the fundamental, i.e., its second harmonic.

Returning to FIG. 1, during the signal reception interval, transducer 10 is transposed to a receiving or detecting mode upon closure of switch S against terminal $S_R$. This alternation will cause the imposition of a D.C. voltage to derive a steady state field of predetermined value across electrode 24 and diaphragm 34. Such a D.C. source is indicated as a battery 54 on line 56. When the diaphragm 34 is set in vibration by incident acoustic waves, the capacitance of transducer unit 10 will vary sympathetically, thereby modulating the electrostatic field impressed across the diaphragm electrode combination from battery source 54. The resultant signal is presented from lines 58 and 60 to a conventional high pass filter shown as a capacitor 62 and inductive winding 64. This high pass filter is tuned to pass only the second harmonic of the fundamental frequency. The advantageous wide band isolating characteristic of the instant system will be immediately apparent, i.e., the transmission function 12 operates at a given fundamental frequency, while the reception function 14 operates at twice that frequency or its second harmonic. From the high pass filter arrangement, the signal is introduced to any of a variety of amplification stages depicted generally at 66 for appropriate analysis. In this regard, it wall be apparent that inductive winding 64 may be present as the primary of an impedance transformer.

Figure 3:
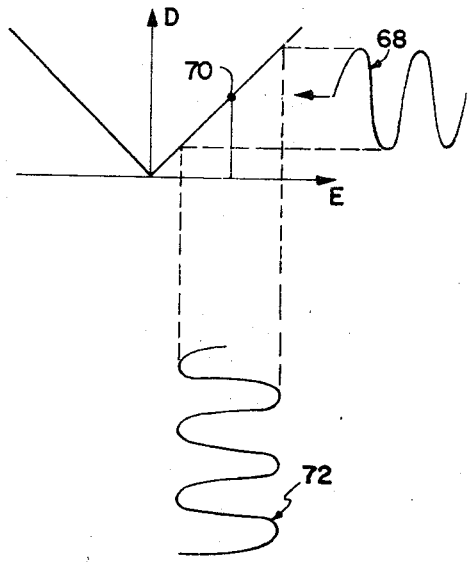
FIG. 3 provides a graphical analysis of a representative waveform encountered in the reception function of the invention.

Turning to FIG. 3, the operation of the transducer 10 during an interval of reception is depicted graphically. In this figure, the displacement D of the center of diaphragm 34 occasioned by the impingement of incident acoustic waves is plotted against the modulated voltage signal E effected by that displacement. These incoming incident waves arrive at the transducer at the above described second harmonic frequency as represented by the sinusoidal source 68. As they impinge, the periodic relative displacement of diaphragm 34 causes a voltage modulation symmetrical about an operating point indicated at 70. Operating point 70 will be recognized as representing the predetermined polarizing voltage from battery 54 selected to provide a potential difference across transducer 10. The vibratory disturbance resulting from waveform 68 produces a sympathetically modulated voltage output signal of like second harmonic frequency such as depicted at 72. This signal is readily inserted through the high pass filter means of the reception function.

As demonstrated in the above discussion, the system of the invention ideally unites a polarizable form of transducer with a wide band frequency spacing of its complementary driving and receiving functions. The form of transducer permitted by this arrangement contributes further advantage. For instance, the very low relative mass of the transducer diaphragm renders it highly damped such that it rapidly reaches a quiescent state in air while still retaining a high degree of sensitivity. This form of transducer is also highly regarded for its accuracy of frequency response. As a result, a singular transducer may be used for both transmitting and receiving acoustic signals. Those versed in the art at hand will recognize that other forms of polarizable transducers may be used with the system. For example, a comparable device may be of the electromagnetic variety having means for selectively impressing a steady state polarizing field between its acoustic diaphragm and magnetic actuator.

Figure 4:
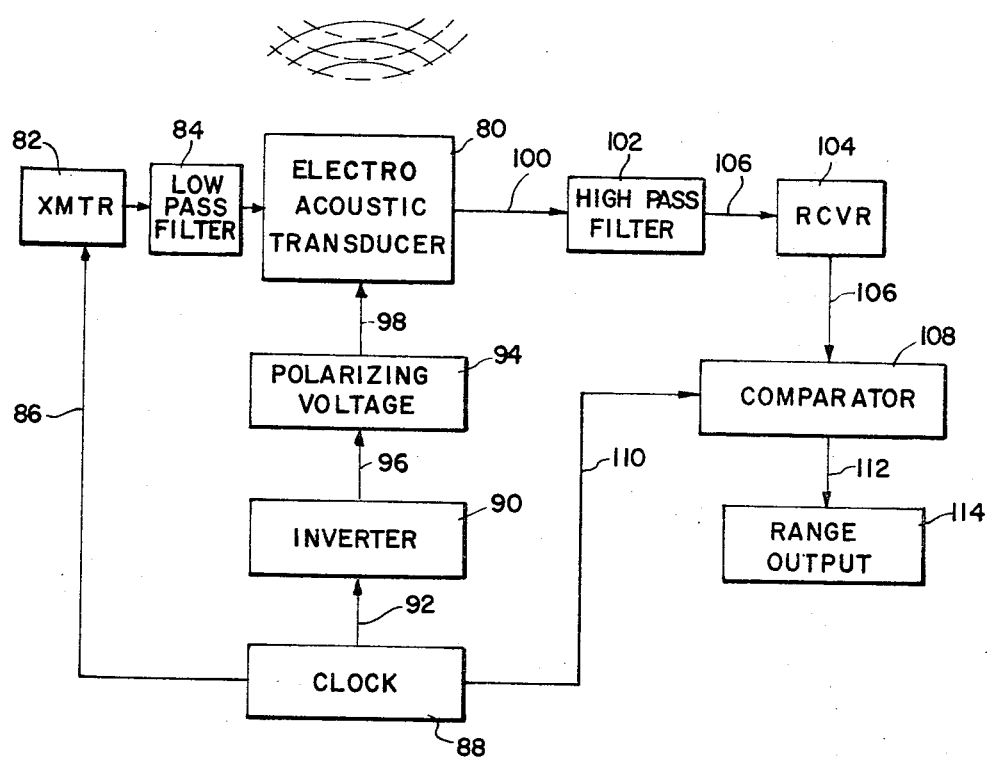
FIG. 4 is a block logic diagram schematically illustrating an acoustic ranging device suitable for incorporation with photographic apparatus.

The system of the invention is ideally suited for use as a rangefinder for photographic cameras and the like. Referring to FIG. 4, a schematic functional representation for such an arrangement is portrayed. In the figure, a single polarizable electro-acoustic transducer 80 of the variety earlier described is mounted in appropriate alignment upon the body of a camera. Transducer 10 is energized at a select fundamental frequency during each transmission interval by a transmitter 82 through a low pass filter 84. Transmitter 82 is sequentially energized in response to the receipt on line 86 of periodic regularly timed and equally dimensioned pulses from an astable multi-vibrator or clock 88. These clock pulses are also introduced to an inverter 90 from line 92. Coupled with a polarizing voltage source 94 at 96, inverter 90 functions to cause a polarization from line 98 of transducer 80 throughout the intervals between the pulses generated at clock 88. The inverter 90 function will be recognized as that provided by the switch mechanism S described earlier and illustrated in FIG. 1.

Transducer 80 will generate regularly spaced acoustic pulses at the first harmonic of the fundamental transmitter frequency. Upon being propagated from the transducer 80, each acoustic pulse travels outwardly until it strikes and is reflected from a body opaque to sound, such as the target selected for ranging. The reflected sonic pulse is thence directed backwardly to the transducer 80 which is polarized at alternate cycles of the fundamental frequency. Signals received by the transducer 80 while in its polarized state are converted to a voltage modulated signal at the second harmonic frequency and are inserted through line 100 and high pass filter 102 into receiver 104 from line 106. Upon being amplified within receiver 104 the signals are introduced through line 106 into a comparator function shown at 108. The comparator also receives the pulse output of clock 88 from along line 110. Using pulse logic circuitry or the like, the comparator 108 correlates the timing of the clock pulses from line 110 with the echo pulse sat line 106 to derive a signal representative of the distance from the camera or transducer 80 to the selected target. The resultant signal is introduced from line 112 into a range output function which may assume a variety of camera adjustment operations. For instance, it may include lens system adjustment mechanisms for achieving automatic focus. A rangefinding and focusing system within which the instant ranging device may be inserted is described in detail in the above referenced application for patent to C. H. Biber and W. R. Pope, Jr.

Since certain changes may be made in the above system and apparatus without departing from the scope of the invention, it is intended that all matter contained in the above description or shown in the accompanying drawings shall be interpreted as illustrative and not in a limiting sense.

What is claimed is:

1. A system for transmitting and detecting acoustic energy signals comprising:
    transmitter means for generating an alternating electrical input of a select first frequency;
    transducer means operable in either of two modes, being driven at said first frequency to oscillate at a second frequency during the first of said modes, and responding to said second frequency to produce an output signal during the second of said modes;
    means coupled with said transducer means for receiving said output signal;
    filter means operative to filter the said output signal to said receiving means and tuned to discriminate against signals of said first frequency and to pass signals of said second frequency; and
    operating means for simultaneously and intermittently operating said transmitter means and causing said transducer to operate in said first mode, and for impressing a steady state electrical polarizing field upon the oscillative function of said transducer means during said second mode of operation.

2. The system of claim 1 wherein said transducer means is operable to oscillate at a said second frequency representing a second harmonic of said select first frequency.

3. The system of claim 2 wherein said filter means is a high pass filter tuned to pass signals of said second frequency.

4. The system of claim 3 wherein said transmitter means includes low pass filter means coupled with said transducer means and operable to pass only said input of said select first frequency.

5. The system of claim 1 in which: said transducer means is operable to oscillate at a said second frequency representing a second harmonic of said first select frequency.

6. The system of claim 1 in which:
    said transducer means is operable to oscillate at a said second frequency representing a second harmonic of said select frequency; and
    said filter means is a high pass filter tuned to pass signals of said second frequency.

7. The system of claim 1 wherein said transducer means includes an electrostatic transducer.

8. The system of claim 7 wherein said electrostatic transducer comprises:
    an airloaded diaphragm vibratile at said second frequency and a driving means spaced therefrom, whereby said output signal is formed as a modulation of said polarizing voltage in correspondence with the frequency of acoustic energy waves incident upon said diaphragm.

9. Acoustic ranging apparatus comprising in combination:
    transmitter means for generating an alternating electrical input of a select first frequency;
    transducer means operable in either of two modes, being driven at said first frequency to oscillate at a second frequency during the first of said modes, and responding to said second frequency to produce an output signal during the second of said modes;
    means coupled with said transducer means for receiving said output signal;
    filter means operative to filter the said output signal to said receiver means and tuned to discriminate against signals of said first frequency and to pass signals of said second frequency;
    means for simultaneously and intermittently operating said transmitter means and causing the said first operational mode, and for impressing a steady state electrical polarizing field upon the oscillative function of said transducer means during said first mode of operation; and
    range output means coupled with said receiver means for deriving a signal representing a transducer-to-target range.

10. The acoustic ranging apparatus of claim 9 in which:
    said transducer means includes an airloaded vibratile surface for generating and responding to acoustic energy; and
    wherein said transducer means is operable to oscillate said surface at a said second frequency representing a second harmonic of said select first frequency.

11. The acoustic ranging apparatus of claim 9 in which said transducer means includes:
    an airloaded vibratile surface for generating and responding to acoustic energy; and
    driver means coupled with said surface, said driver means being receptive to said first frequency so as to cause said surface to oscillate at said second frequency.

12. The acoustic ranging apparatus of claim 11 wherein said transducer means is operable to oscillate at a said second frequency representing a second harmonic of said select first frequency; and
    wherein said filter means is a high pass filter tuned to pass signals of said second frequency.

13. The acoustic ranging apparatus of claim 12 wherein said transmitter means includes low pass filter means coupled with said transducer means and operable to pass only said input of said select first frequency.

14. The acoustic ranging apparatus of claim 13 wherein:
    said vibratile surface and said driver means are electrostatically coupled; and
    wherein the said electrical polarizing field impressed by said operating means is a steady state polarizing voltage of predetermined value, whereby said output signal is formed as a modulation of said polarizing voltage in correspondence with the frequency of acoustic energy waves incident upon said surface.

References Cited

UNITED STATES PATENTS 2,710,388   6/1955   Chun _____ 340—3

RICHARD A. FARLEY, Primary Examiner

U.S. Cl. X.R.

340—3